United States Patent [19]

Weckler et al.

[11] 4,250,296

[45] Feb. 10, 1981

[54] LEVELLING AGENT AND PROCESS FOR THE EVEN DYEING OF MATERIALS MADE OF SYNTHETIC FIBERS

[75] Inventors: Gerhard Weckler, Sulzbach; Hans J. Hauss, Frankfurt am Main; Karl Hintermeier, Frankfurt am Main; Friedrich Engelhardt, Frankfurt am Main, all of Fed. Rep. of Germany

[73] Assignee: Cassella Aktiengesellschaft, Frankfurt am Main, Fed. Rep. of Germany

[21] Appl. No.: 933,887

[22] Filed: Aug. 15, 1978

[30] Foreign Application Priority Data

Aug. 18, 1977 [DE] Fed. Rep. of Germany ....... 2737239

[51] Int. Cl.³ .............................................. C08G 63/68
[52] U.S. Cl. .................................................... 528/295
[58] Field of Search ................................ 528/301, 295

[56] References Cited

U.S. PATENT DOCUMENTS

| | | | |
|---|---|---|---|
| 3,033,824 | 5/1962 | Huffman | 528/301 |
| 3,083,187 | 3/1963 | Stuart | 528/301 |
| 3,563,942 | 2/1971 | Heiherger | 528/295 X |
| 3,725,348 | 4/1973 | Harrison et al. | 528/295 X |
| 3,734,874 | 5/1973 | Kibler et al. | 528/301 |
| 3,936,389 | 2/1976 | King et al. | 528/301 |
| 4,104,262 | 8/1978 | Schade | 528/295 |

Primary Examiner—Lewis T. Jacobs
Attorney, Agent, or Firm—Connolly and Hutz

[57] ABSTRACT

Disclosed is a polycondensate of (a) water soluble or dispersible polyester having a molecular weight of 600–5000 prepared by reacting a carboxylic acid and a diol or polyol wherein 5–40 moles percent of the acid or hydroxy compounds contain sulfo substituents and (b) a compound of the formula $$R-O-(CH_2CH_2O)_m-CH_2CH_2OH$$

wherein m is a number from 5 to 50 and R is selected from the group consisting of alkyl of 6–22 carbon atoms, alkenyl of 6–22 carbon atoms, alkanoyl of 6–22 carbon atoms, aryl of 6–22 carbon atoms, aralkyl of 6–22 carbon atoms, castor oil radical and

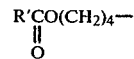

wherein R' is alkyl or alkenyl each having 6–22 carbon atoms. The polycondensate is useful as a modifier for aminoplast resins and as a leveller in dyeing.

11 Claims, No Drawings

LEVELLING AGENT AND PROCESS FOR THE EVEN DYEING OF MATERIALS MADE OF SYNTHETIC FIBERS

The invention relates to a polycondensate which is soluble or dispersible in water, a process for its production and the use of the polycondensate as a levelling agent in processes for the even dyeing of materials made of synthetic fibers, such as for example, fibers of cellulose triacetate, polyurethane, polyamides, but especially fibers of linear polyesters and their mixtures with natural fibers, using dispersion dyestuffs.

A process is known for the even dyeing of fiber material consisting of linear polyesters and mixtures thereof with natural fibers using water-insoluble dispersion dyestuffs according to the exhaust methods (German published Patent Application No. 25 08 472), in which one adds to the aqueous dye baths in addition to the said dyestuffs and pH regulators in addition as levelling agents linear polyesters which are soluble or dispersible in water with an average molecular weight of 800 to 5000, and are obtained by the polycondensation of (a) one or more saturated or unsaturated aliphatic, cycloaliphatic or aromatic dicarboxylic acids with (b) one or more saturated or unsaturated aliphatic, cycloaliphatic or aromatic diols, and in which 5 to 30 moles percent of all the dicarboxilic acid or diol chain members carry sulpho groups or their salts, in quantities of 0.1 to 5 g/liter.

It has also already been proposed in such a process that one should use as dispersing agent instead of the linear polyester which is soluble or dispersible in water a branched polyester containing sulphonate groups soluble or dispersible in water and having a molecular weight of 600 to 5000, in the manufacture of which, relative to 100 moles percent of the polycarboxylic acid component one uses 1 to 40 moles percent of branching components, that is to say for example tricarboxylic acids, tetracarboxylic acids, tri-alcohols or tetra-alcohols.

The polycondensates of the invention possess further improved properties when used as levelling agents for the even dyeing of materials made of synthetic fibers using disperse dyestuff.

The invention relates to a polycondensate which is soluble or dispersible in water, produced by reacting (A) a linear or branched polyester which is soluble or dispersible in water with an average molecular weight of 600 to 5000, and which has been obtained by polycondensation of
- (a) 100 mole percent of one or more saturated or unsaturated aliphatic, cycloaliphatic or aromatic dicarboxylic acids and possibly polycarboxylic acids with
- (b) 90 to 120 mole percent of one or more saturated or unsaturated aliphatic, cycloaliphatic or araliphatic diols and possibly a polyol(polyols) and/or of a saturated, aliphatic, cycloaliphatic or an araliphatic diol (diols) containing an ether group, and in which 5 to 40 moles percent, preferably 5 to 30 moles percent, of all the dicarboxylic and polycarboxylic acid or diol or polyol chain members carry sulpho groups in the form of their salts, and (B) a compound of the general formula $$R-O-(CH_2CH_2O)_n-CH_2CH_2OH$$

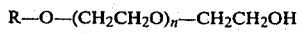

in which
  n = 5 to 50 and
  R is an alkyl, alkenyl, acyl, aryl or aralkyl radical with 6 to 22 carbon atoms, the castor oil radical or the grouping $R'-COO-CH_2-CH_2CH_2CH_2-$ in which R' is an alkyl or alkenyl radical with 6 to 22 carbon atoms in a proportion by weight of A:B = 1:(0.2 to 2).

The term acyl radical is to be understood as to mean the radical $R''-CO$-derived from an organic, aliphatic, araliphatic or aromatic carboxylic acid. The radicals represented by R and R' may also be substituted, especially by hydroxyl.

For the production of the polycondensate according to the invention the components mentioned under A and B are reacted at temperatures of 100° to 300° C., preferably 150° to 250° C., that is to say they are heated to these temperatures and fused together. The reaction times are from 10 minutes to 10 hours, preferably 2 to 5 hours. Normally, the reactants A and B are fused together without using a solvent or diluent. The reaction can be carried out under normal pressure, but the use of reduced pressure is also advantageous. Preferably, the polycondensation is carried out under a pressure of 0.4 to 20 mm Hg. The volatile products resulting during the reaction are distilled off. Advantageously, the reaction mixture is stirred during the reaction.

The reaction between the polyester A and the ethylation component B is usually carried out in the presence of an esterification or transesterification catalyst. Such catalysts possess, for example, the general formula $$Me(OR)_x$$

in which
  X signifies the valency of the metal Me and
  Me signifies titanium, sodium, potassium, calcium, magnesium and
  R signifies alkyl with 1 to 6 carbon atoms.

However, it is also possible to use other known esterification or transesterification catalysts, such as acetates, for example manganese or zinc acetate. However, the polycondensation can also be carried out completely without a catalyst (usually with a prolongation of the reaction time).

The polycondensates of the invention are viscous melts which, when diluted with water, give clear to opalescent viscous solutions or dispersions. When diluting them with water one can either stir the melt into water or the water into the polycondensate. The aqueous solutions of the polycondensate generally have a weakly acid pH. It is advantageous to adjust the aqueous solutions to pH values of 6 to 7 by stirring in an inorganic or organic base, such as for example sodium or potassium hydroxide solution.

The polyesters required for the production of the polycondensates according to the invention can be either straight or branched.

The linear polyesters soluble or dispersible in water can be produced in a manner known per se by polycondensation of 100 moles percent of dicarboxylic acids with 90 to 120 moles percent of diols, in which in all 5 to 40 moles percent, preferably 5 to 30 moles percent, of the dicarboxylic acids and/or of the dihydroxy compounds must carry sulfo groups or their salts.

As dicarboxylic acids it is possible to use saturated and unsaturated aliphatic, cycloaliphatic, araliphatic or aromatic dicarboxylic acids.

Preferably, one uses dicarboxylic acids with 4 to 10 carbon atoms, especially the benzenedicarboxylic acids. Examples of suitable dicarboxylic acids are: succinic acid, glutaric acid, adipic acid, suberic acid, maleic acid, fumaric acid, itaconic acid, cyclohexane-1,4-dicarboxylic acid, cyclohexane 1,3-dicarboxylic acid, phthalic acid, isophthalic acid, terephthalic acid, the naphthalenedicarboxylic acids, such as for example 1,4-naphthalenedicarboxylic acid, 1,5-naphthalenedicarboxylic acid, as well as diphenic acids, norbornanedicarboxylic acid etc. Instead of the dicarboxylic acids it is also possible to use their derivatives, such as anhydrides, acid halides, especially acid chlorides, esters, especially those of alcohols with 1 to 4 carbon atoms which can easily be distilled off. Preferably, one uses a mixture of dicarboxylic acids and/or dicarboxylic acid derivatives. Suitable esters, anhydrides and acid chlorides are for example: dimethyl terephthalate, diethyl terephthalate, dipropyl terephthalate, diisopropyl terephthalate, dibutyl terephthalate, dimethyl isophthalate, diethyl isophthalate, dipropyl isophthalate, dibutyl isophthalate, dimethyl phthalate, diethyl phthalate, dipropyl phthalate, diisopropyl phthalate, dibutyl phthalate, dimethyl, diethyl, dipropyl or dibutyl malonate, dimethyl or dibutyl succinate, diethyl or diisopropyl glutarate, diethyl or diisobutyl adipate dimethyl, diisopropyl or dibutyl pimelate, dimethyl, diethyl, dipropyl or dibutyl suberate, dimethyl, diethyl, dipropyl, dibutyl 1,4-cyclohexane dicarboxylate, dimethyl, diethyl, dipropyl, dibutyl 1,2-cyclohexane dicarboxylate, dimethyl, diethyl, dipropyl, dibutyl 1,3-cyclohexane dicarboxylate, phthalic anhydride, maleic anhydride, succinic anhydride, phthalyl chloride.

Suitable esters can also be those with the diols listed below as alcohol components.

Suitable as diols for the linear polycondensates to be used according to the invention are saturated, unsaturated aliphatic, cycloaliphatic and araliphatic compounds, preferably those with 2 to 10 carbon atoms, particularly saturated, aliphatic, cycloaliphatic or araliphatic dioles with ether bridges. In the case of the compounds containing ether groups, however, the preferred range stated of 2 to 10 carbon atoms applies only to each of the aliphatic moities between two ether bridges or oxygen atoms.

Examples of suitable diols are: ethyleneglycol, propanediol-1,2 and propanediol-1,3, ethyleneglycol-mono-(3-hydroxy-propyl) ether, ethyleneglycol-mono-(3-hydroxy-propyl-2) ether, ethyleneglycol-mono-(2-hydroxy-propyl) ether, butandiols, especially butandiol-1,4, pentandiols, such as pentandiol-1,5, hexandiols, especially hexandiol-1,6, decandiol-1,10, diethylene glycol, dipropyleneglycol, bis(3-hydroxypropyl) ether, triethyleneglycol, tetra-ethyleneglycol, tripropyleneglycol, 4,8-dioxadecan-1,10-diol, polyethyleneglycols with a molecular weight of 300 to 2000, polypropyleneglycols with a molecular weight of 300 to 2000, polyethers of propandiol-1,3 and mixed polyethers of ethyleneglycol with propyleneglycol and/or possibly propandiol-1,3, the said polyethers possessing molecular weights of 300 to 2000, bis-(4-hydroxy-butyl) ether, 2-methylenepropandiol-1,3, 2,4-dimethyl-2-ethylhexandiol-1,3, 2-ethyl-2-butyl-propandiol-1,3, 2,2-dimethylpropandiol-1,3, 2-ethyl-2-isobutyl-propandiol-1,3, 2,2,4-trimethyl-hexandiol-1,6, 1,3-dihydroxy-cyclohexane, 1,4-dihydroxy-cyclohexane(Chinit), 1,4-bis-(hydroxymethyl)-cyclohexane, 1,3-bis(hydroxymethyl)-cyclohexane, 1,2-bis(hydroxymethyl)-cyclohexane, 1,4-bis(hydroxymethyl)-bezene, 1,3-bis(hydroxymethyl)-benzene, 2,6-bis(hydroxymethyl)-naphthalene.

Furthermore, diphenols are suitable, for example, which have been converted by reacting at both ends with ethylene oxide into araliphatic bishydroxy compounds and to which it is possible to allocate, for example, the general formula

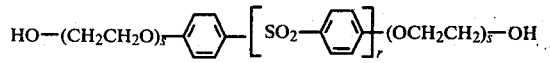

in which
r=0 or 1
s=1, 2, 3 or 4.

Representatives of such products are for example:

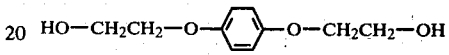

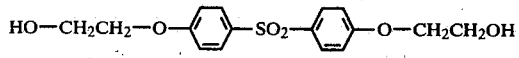

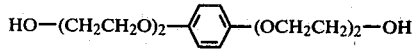

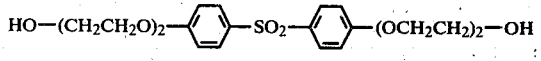

and also other products oxethylated more than once at both ends.

Preferred diol components are the diethyleneglycol and, furthermore, the triethyleneglycol. It is also the diols that may advantageously be employed as mixtures, for instance, a mixture consisting of diethylene and triethyleneglycol. Other preferred mixtures contain 40 to 95 moles percent of diethylene and/or triethyleneglycol and 5 to 60 moles percent of other diols, especially those having more than two ether bridges and particularly advantageously polyethyleneglycols of a mean molecular weight of 300 to 1000.

An aliquot part of the dicarboxylic acids and of the diols can be replaced by hydroxycarboxylic acids which, preferably, contain from 2 to 11 carbon atoms.

Examples of suitable hydroxycarboxylic acids are: glycolic acid, lactic acid, 3-hydroxypropionic acid, 4-hydroxybutyric acid, 5-hydroxypenten-3-oic acid, mandelic acid, 3-hydroxymethyl-cyclohexane-carboxylic acid, 4-hydroxy-methylcyclohexane-carboxylic acid, 6-hydroxymethyl-decaline-carboxylic acid(-2), 3-hydroxyethyl-benzoic acid,

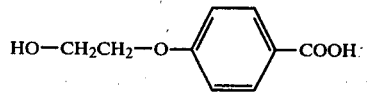

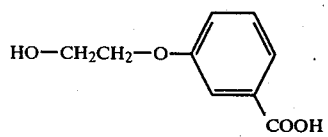

It is also possible to use derivatives of hydroxycarboxylic acids, such as for example esters.

As examples of suitable esters of hydroxycarboxylic acids one may mention: methyl lactate, ethyl lactate, methyl 4-hydroxybutyrate, ethyl mandelate,

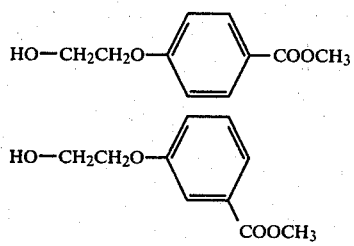

If hydroxycarboxylic acids or their derivatives are used, one preferably replaces at most 40 moles percent of the dicarboxylic acid and diol content with hydroxycarboxylic acids or their derivatives.

As components which carry sulpho groups in the form of their salts, especially in the form of alkali, ammonium, substituted ammonium or triethanolammonium salts, one can use aliphatic, cycloaliphatic or aromatic dicarboxylic acids, aliphatic, cycloaliphatic or araliphatic diols, hydroxycarboxylic acids, and, insofar as one is dealing with carboxylic acids, also their derivatives, especially esters. Examples of such compounds are: sodium sulphonato-succinic acid, potassium sulphonato-succinic acid, ammonium sulphonato succinic acid, 4-sodium-sulphonato-phthalic acid, 4-sodium-sulphontatophthalic anhydride, 4-potassium-sulphonato-phthalic acid, 2-sodium-sulphonato-terephthalic acid, 2-sodium-sulphonato-terephthalic acid dichloride, 5-sodium-sulphonato-isophthalic acid, 5-sodium-sulphonato-propoxyisophthalic acid, 5-sodium-sulphonato-ethoxyisophthalic acid, dimethyl sodium-sulphonato-succinate, diethyl sodium-sulphonato succinate, diethyl 4-sodium-sulphonato-phthalate, dimethyl 4-sodium-sulphonato-phthalate, dimethyl 4-ammonium-sulphonato-phthalate, diethyl 2-sodium sulphonato-terephthalate, dimethyl 5-sodium-sulphonato isophthalate, dimethyl 5-sodium-sulphonato-propoxyisophthalate, diethyl 5-sodium-sulphonato-ethoxy-isophthalate, diisopropyl 5-sodium-sulphonato-ethoxy-isophthalate, di-n-propyl 5-potassium-sulphonato-ethoxy-isophthalate,

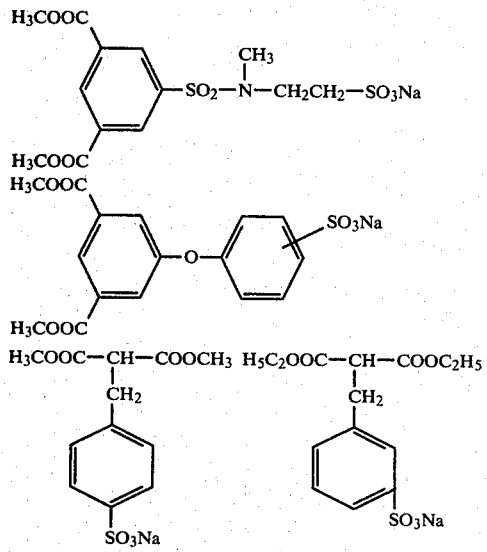

As examples of hydroxycarboxylic acids carrying sulphonato groups or their esters one may mention: 5-sodium-sulphonato-salicyclic acid, methyl 5-sodium-sulphonato-benzoate

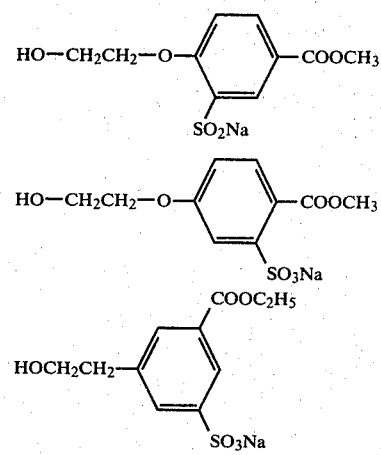

Furthermore, the following diols or ethoxylated diphenols containing sulphonato groups are suitable:

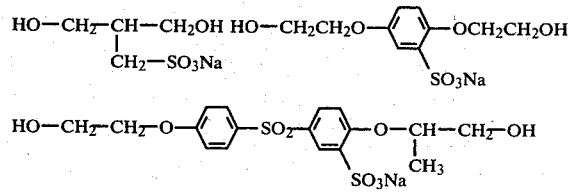

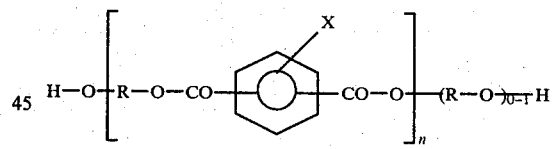

Disodium-3,6-disulphonato-2,7-dihydroxynaphthalene, disodium-3,6-disulphonato-1,8-dihydroxynaphthalene.

For the purpose of the invention one prefers linear polyesters of the following general formula $$H-O\left[R-O-CO-\underset{\underset{J_n}{}}{\bigcirc}^X-CO-O\right](R-O)_{\overline{n-1}}H$$

in which
X = —H, —O—CH$_2$—CH$_2$—CH$_2$—SO$_3$M or SO$_3$M
M = alkali metal, ammonium,
R = a diol radical (cf. the divalent radicals of the before-mentioned diols) of a saturated or an unsaturated aliphatic, cycloaliphatic or an araliphatic compound having two to ten carbon atoms and/or of a saturated, aliphatic, cycloaliphatic or araliphatic compound containing an ether group with two to ten carbon atoms in the aliphatic moieties between two oxygen atoms,
n = is of such a mignitude that the average molecular weight of the polyester is between 800 and 5000.

Particularly preferred in this case are water-soluble polyesters in which 10 to 20 moles percent of the phenylene radicals are obtained by condensing in dimethyl 5-sodium-sulphonatopropoxy-isophthalate or dimethyl 5-sodium-sulphonato-isophthalate,
40 to 90 moles percent by condensing in isophthalic acid or its derivatives, especially its simple esters, and 0 to 40 moles percent by condensing in terephthalic acid or its simple esters, preferable in the form of its dimethyl ester, and also 40 to 100 moles percent of the diols employed are diethylene and/or triethyleneglycol and 0 to 60 moles percent of the diols employed are one or more of other diols, especially those having more than two ether bridges and particularly advantageously polyethylene glycol of a mean molecular weight of 300 to 1000.

A variation of the above general formula consists in the fact that one replaces 0 to 40 moles percent of the total proportion of benzene dicarboxylic acids in the formula with an aliphatic or cycloaliphatic dicarboxylic acid with 4 to 10 carbon atoms.

Instead of the linear polyesters which are preferred for the production of the levelling agent according to the invention, it is also possible to use branched water-soluble or water-dispersible polyesters which in principle are produced like the abovementioned linear polyesters, but in which one has to use at least one branching component.

Such branching components can be:

(a) polycarboxylic acids with 3, 4 or 5, preferably 3 and 4, carboxylic groups or their esters, especially of lower alcohols with 1 to 4 carbon atoms, their anhydrides or acid chlorides, (b) polyhydroxy compounds with 3, 4 or 5, preferably 3 hydroxy groups, (c) hydroxycarboxylic acids with a total of 3, 4 or 5, preferably 3 and 4, hydroxy and carboxylic acid groups or their derivatives, especially their esters of lower alcohols with 1 to 4 carbon atoms.

Also the abovementioned polycarboxylic acids with 3, 4 or 5, preferably 3 or 4, carboxyl groups, the polyhydroxy compounds or the hydroxycarboxylic acids mentioned under (c) can, if desired, carry an $SO_3M$ group, in which M signifies an alkali metal or ammonium.

Suitable branching polycarboxylic acids or their derivatives are for example: trimellithic acid, trimensinic acid, hemimellithic acid, mellophanic acid, prehnitic acid, pyromellithic acid, aconitic acid, tricarballylic acid, ethanetetracarboxylic acid, trimellithic anhydride, pyromellithic dianhydride, hemimellithic anhydride, mellophanic dianhydride, prehnitic anhydride, trimethyl trimellithate, triethyl trimellithate, trimethyl trimesinate, trimethyl hemimellithate, tetramethyl mellophanate, tetramethyl prehnitate, tetramethyl pyromellithate, tetraethyl pyromellithate, 1,2,3-cyclohexanetricarboxylic acid, 1,2,4-cyclohexanetricarboxylic acid, 1,3,5-cyclohexanetricarboxylic acid, naphthalenetricarboxylic acids.

Suitable polyhydroxy compounds are, for example: glycerol, erythritol, pentaerythritol, trimethylolpropane, trimethylolethane.

Suitable branching hydroxycarboxylic acids or their derivatives are, for example, citric acid, malic acid, tartaric acid, trimethyl citrate, dimethyl malate, dimethyl tartrate.

One uses especially those branched water-soluble or water-dispersible polyesters which, referred to 100 moles percent of the components carrying carboxyl groups present contain 1 to 40 moles percent, preferably 5 to 40 moles percent of branching components. Preferably, also out of the dicarboxylic acid components present at least 40 moles percent consist of benzene dicarboxylic acids, especially isophthalic acid. Furthermore, it is advantageous if the compounds of the components carrying hydroxyl groups are chosen in such a way that, referred to 100 moles percent of the diols and polyols, they consist at least to the extent of 40 moles percent of diethyleneglycol and/or triethyleneglycol.

The requisite water-soluble or water-dispersible linear or branched polyesters containing sulphonato groups can also be obtained by introducing the water-solubilising sulphonate groups into suitable, unsaturated polyesters by adding bisulphite on to polyesters containing double bonds, in accordance with unexamined German application 23 35 480 laid open to public inspection.

The determination of the apparent average molecular weight is carried out in a vapor pressure osmometer using dimethylformamide as solvent. (The method of the molecular weight measurement by vapor pressure osmometer is, for instance, described by S. Kume and H. Kobayashi: Makromol. Chem. 79, (1964), 1-7).

Because of the dissociation of the sulphonate groups, the effective mean of the molecular weight is higher than the apparent value so measured. The measured value, however, is a sufficiently accurate criterion for characterising the degree of condensation of the mixed polyesters according to the invention and for determining the end product of the condensation.

The ethoxylation products B required for the production of the levelling agent according to the invention are in some cases available on the market as emulsifiers and are obtained in a manner known per se by reacting of the reactants mentioned below with 5 to 50 moles of ethylene oxide.

Suitable initial products for the reaction with ethylene oxide are, for example, n-hexanol, n-heptanol, isooctanol, lauryl alcohol, cetyl alcohol, stearyl alcohol, oleyl alcohol, caproic acid, capric acid, caprylic acid, lauric acid myristic acid, palmitic acid, stearic acid, arachidic acid, behenic acid, oleic acid, ricinoleic acid, linoleic acid, and also the monoesters of the abovementioned acids and butandiol(1,4), that is to say for example 4-hydroxybutyl caproate, 4-hydroxybutyl laurate, 4-hydroxybutyl palmitate, 4-hydroxybutyl stearate, 4-hydroxybutyl oleate, 4-hydroxybutyl ricinoleate, 4-hydroxybutyl linolate, as well as castor oil, phenol, mandelic acid, salicylic acid, α-naphthol, β-naphthol, tert.-butylphenol, hexylphenols, nonylphenols, isododecylphenol, tri-tert.-butylphenol.

Reactions of ethylene oxide with compounds containing alcoholic groups are described in Houben-Weyl: Methoden der Organischen Chemie, Vol. XIV/2 (1963), 447-448; Ullmanns Encyclopädie der techn. Chemie, 3rd Edt. Vol. 14 (1963) 49-51; N. Schönfeld: Surface Active Ethylene Oxide Adducts, Pergamon Press 1969, 104-109. The reaction of the above mentioned initial products with ethylene oxide can be carried out according to these known processes.

The polycondensation products of the invention produced from the components A and B are superior for special fields of use to the previously described linear or branched water-soluble polyesters, such as for example as modifiers for aminoplast resins or as levellers when dyeing materials made of synthetic fibers or mixtures thereof with natural fibers, using disperse dyestuffs. In the process according to the invention for the even dyeing of materials consisting of synthetic fibers and their mixtures with natural fibers using water-insoluble disperse dyestuffs using the exhaust process, there is added to the aqueous dye baths, in addition to the dispersion dyestuffs and substances to regulate the pH, a polycondensation product of the present invention to act as leveler, advantageously in the form of its aqueous solution, in quantities of 0.02 to 5 g/liter (referred to 100% polycondensation product), preferably 0.2 to 2 g/liter, and the dyeing is otherwise carried out in the usual, known manner. A high stability of dye liquor is achieved and completely even dyeing are obtained with a high dyestuff yield. Also in the case of goods which are difficult to dye, such as for example wound packages or dyestuffs which are difficult to colour, outstanding results are obtained by the process of the present invention. Particularly good results are obtained in the rapid dyeing process. In such rapid dyeing processes there is offered to the goods to be dyed at temperatures of about 130° C. all of a sudden comparatively large quantities of dyestuff. The resultant risk of unevenness is avoided by the use of the polycondensation product of the present invention.

For carrying out the dyeing process of the present invention, the dye baths are started in the usual manner at 50° to 60° C. and are adjusted to a pH of 4 to 6 by means of substances which adjust the pH. Then the levelling agent of the present invention, possible in the form of a solution, is added in quantities of 0.02 g/liter to 5 g/liter, preferably 0.2 to 2 g/liter (relative to 100% polycondensate).

Then the pre-dispersed water-insoluble disperse dyestuff and the material to be dyed are added and heated to the requisite dyeing temperature and are dyed for the usual length of time. The dyeing is completed in a known manner, for example, by reductive after-treatment.

In the case of rapid dyeing processes the liquor is prepared separately from the material to be dyed with the addition of the polycondensate according to the invention. The liquor which has been heated to the dyeing temperature of 120° to 130° C. is then rapidly brought into contact with the material to be dyed. If one uses the injection technique, it is possible for the polycondensation product according to the invention also to be added to the dyebath prior to the addition of the dyestuff dispersion.

When applying the polycondensates according to the invention it is also possible for the use to be carried out in other solvents or this may be preferable, particularly a partial addition of other solvents, preferably alcohols, such as methanol, ethanol or isopropanol, or else dipolar aprotic solvents, such as dimethylformamide or dimethylsulfoxide.

In the below-mentioned examples the following abbreviations are used:
SPO=dimethyl 5-sodiumsulphonatopropoxy-isophthalate
DMT=dimethyl terephthalate
IPA=isophthalic acid
DEG=diethyleneglycol
PEG=polyethyleneglycol
EO=ethylene oxide
SIM=dimethyl 5-sodiumsulphonatoisophthalate
DPG=dipropyleneglycol
PMSA=pyromellitic dianhyride In the following illustrative embodiments of the invention, all the parts are parts by weight and all the percentages are percentages by weight.

EXAMPLE 1

(10 moles percent SPO, 40 moles percent DMT, 50 mole percent IPA, 100 moles percent DEG, 10 moles percent PEG 600, the same quantity of ethoxylation product of 1 mole of castor oil and 30 moles of EO).

In a 4-liter ground glass four-necked flask with stirrer, thermometer, gas inlet tube and descending condenser there are heated 132.5 g of diethyleneglycol (1.25 moles), 75 g polyethyleneglycol 600 (0.125 moles), 97 g of dimethyl terephthalate (0.5 moles), 44.25 g of dimethyl 5-sodium-sulphonato-propoxy-isophthalate (0.125 moles) and 2 g of titanium tetraisopropylate under an atmosphere of nitrogen for a period of 1 hour up to 150° C. When this is done, approximately 12 g of methanol distils off. The temperature of the melt is increased over 1 hour to 160° C. and after this over a further hour to 170° C. When this is done, a further approximately 18 g of methanol distils off. Now there are mixed with the melt 103.75 g of isophthalic acid of a purity of 99% and, whilst constantly passing over a weak stream of nitrogen, the temperature is then raised per hour by 10° C. until after 5 hours a temperature of 220° C. is reached. When this is done, there gradually distil off approximately 20 g of water, which still contains a certain amount of methanol. Now it is heated to 220° to 225° C. for a further 4 hours under an atmosphere of nitrogen, while, as is done during the entire reaction, the melt has to be vigorously stirred continuously. Then a water jet vacuum of approximately 10 mm Hg is applied and the stirring is continued at 220° to 225° C. until the apparent mean molecular weight has reached a value of approximately 2000, which is the case after about 6 hours. One obtains 380 g of a highly viscous amber-coloured melt into which one stirs carefully (with the exclusion of air!) at 220° to 225° C. the same weight of the liquid commercial addition product of 30 moles of ethylene oxide on to 1 mole of castor oil. Then the mixture is heated for 4 hours at 220° to 225° C. in a vacuum of approximately 10 mm Hg accompanied by thorough agitation, when only a little distillate escapes and appr. 760 g of light-coloured homogeneous melt results. After cooling, it is then easily dissolved by 3040 g of water to form 3800 g of a light-coloured 20% solution with a pH of appr. 5.7, which is raised to 7.0 by the addition of a very small quantity of sodium hydroxide solution. If the solution is not completely clear, it can easily be completely clarified by stirring with 1% diatomaceous earth and forcing through a pressure filter.

EXAMPLE 2

In Example 1 one replaces the SPO by the equivalent quantity of 5-sodiumsulphonatoisophthalic acid or its dimethyl ester and in this way one obtains a product which is appr. of the same value as regards its leveling action.

EXAMPLE 3

If one replaces the SPO in Example 1 by an equivalent quantity of dimethyl or diethyl 2-sodiumsulphonato-terephthalate, one also obtains a product which is appr. the same in value as regards its action as a leveler for rapid dyeings.

EXAMPLE 4

If one replaces the SPO in Example 1 by an equivalent quantity of dimethyl or dipropyl 4-potassium-sulphonatophthalate, one also obtains a product which is appr. the same value as regards its action as a leveler for rapid dyeings.

EXAMPLE 5

If an Example 1 instead of 380 g of ethoxylation product (=100%) one adds to the melt only 76 g (=20%), but otherwise carries out the condensation for exactly the same length of time, one also obtains a very valuable level-dyeing assistant, the yield of which is also greater than when there is no addition of the ethoxylation product.

EXAMPLE 6

If in Example 1 instead of 380 g of ethoxylation product (=100%) one adds to the melt only 180 g of the ethoxylation product (=50%), but otherwise carries out the condensation for exactly the same length of time, one also obtains a very valuable leveling product, whose yield il also greater than when there is no addition of the ethoxylation product.

EXAMPLE 7

If in Example 1 instead of 380 g of ethoxylation product (=100%) one adds to the melt 760 g of the ethoxylation product, but otherwise carries out the condensation for exactly the same length of time, one also obtains a very valuable level-dyeing assistant, the yield of which is also greater than without the addition of the ethoxylation product.

EXAMPLE 8

(10 moles percent SIM; 50 moles percent IPA; 40 moles percent DMT; 100 moles percent DPG; + the same quantity of the addition product of 30 moles EO on to castor oil).

In the experimental apparatus of Example 1, 201 g of dipropyleneglycol (1.5 moles), 44.4 g of dimethyl 5-sodium-sulfonatoisophthalate (0.15 moles); 116.4 g of dimethyl terephthalate and 2 g of titanium tetraisopropylate are heated to 150° C. over the course of one hour (under an atmosphere of nitrogen and accompanied by thorough stirring). When this is done, there distil off approximately 24 g of methanol. During the course of a second hour, the temperature is then raised to 160° C. and during the course of a third hour to 170° C. When this is done, there distil over a further appr. 8 g of methanol. Now one adds to the melt with the exclusion of air 124.5 g of 994 isophthalic acid. The temperature is then raised further every hour by 10° C. until after 5 hours one has reached an interior temperature of 220° C. When this is done there distil off appr. 25 ml of water, with which still a certain amount of methanol is mixed. Still whilst passing over a weak stream of nitrogen, the melt is then stirred vigorously for a further 4 hours at 220° to 225° C., when once again a further appr. 8 g of water distil off. Then a water jet vacuum of appr. 10 mm Hg is applied, and the stirring is continued until the apparent mean molecular weight has reached appr. 2300, which is the case after about 6 hours. One obtains 377 g of an amber-coloured melt to which, whilst still hot, one adds the same weight of an addition product of 30 moles of ethylene oxide on to 1 mole of castor oil. Then this mixture is thoroughly stirred in a vacuum of appr. 10 mm Hg at 220° to 225° C. for 4 hours, when only a little distillate escapes and there result appr. 752 g of a light-coloured homogeneous melt. After cooling, this is easily dissolved in 3008 g of water to give 3760 g of a light-coloured 20% solution of a pH of 4.8, which one advantageously raises to 7.0 by the addition of a small quantity of sodium hydroxide solution. The product is outstandingly suitable as a leveling agent for rapid dyeing processes in the case of polyester threads.

EXAMPLE 9

If in Example 8 one replaces the addition product of 30 moles of EO on to 1 mole of castor oil by the same weight of an addition product of 10 moles of EO on to 1 mole of tert.-butylphenol, one also obtains a very valuable leveling agent.

EXAMPLE 10

If in Example 8 one replaces the addition product of 30 moles of EO on to 1 mole of castor oil by the same weight of an addition product of 20 moles of EO on to 1 mole of oleyl alcohol, one also obtains a very valuable level-dyeing assistant.

EXAMPLE 11

If in Example 8 one replaces the addition product of 30 moles of EO on to 1 mole of castor oil by the same weight of an addition product of 15 moles of EO on to 1 mole of dodecyl alcohol, one also obtains a very valuable level-dyeing assistant.

EXAMPLE 12

If in Example 8 one replaces the addition product of 30 moles of EO on to 1 mole of castor oil by the same weight of an addition product of 30 moles of EO on to 1 mole of ricinoleic acid, one also obtains a very valuable level-dyeing assistant.

EXAMPLE 13

If in Example 8 one replaces the addition product of 30 moles of EO on to 1 mole of castor oil by the same weight of an addition product of 50 moles of EO on to 1 mole of behenic acid, one also obtains a very valuable level-dyeing assistant.

EXAMPLE 14

(15 moles percent SIM; 75 moles percent IPA; 10 moles percent PMSA; 10 moles percent DEG; + the same weight of an addition product of 50 moles of EO on to 1 mole of castor oil).

In the experimental apparatus of Example 1 there are thoroughly stirred 159 g of diethyleneglycol (1.5 moles), 66.6 g of dimethyl 5-sodiumsulfonatoisophthalate (0.225 moles), 32.7 g of pyromellithic dianhydride (0.15 moles) and 186.6 g of 99% isophthalic acid (1.125 moles) and they are heated under an atmosphere of nitrogen to 150° C. over the course of 1 hour. The temperature is then raised by 10° C. per hour until after 5 hours a temperature of 200° C. is reached. Now the heating is continued further at this temperature until a sample dissolves to give a clear solution in water, that is to say no powdered isophthalic acid separates out any longer. This is the case after about 2 hours, and the acid value is then 90 and the apparent mean molecular weight is appr. 800. One stirs the same quantity of an addition product of 50 moles of ethylene oxide on to 1 mole of castor oil into the existing 328 g of melt and it is then further heated for 4 hours in a vacuum of appr. 10 mm Hg. In this way one obtains appr. 652 g of light-coloured homogeneous melt which, after cooling, can easily be diluted with 2608 g of water to form 3260 g of clear amber-coloured 20% solution. It is neutralised with appr. 40 ml of 25% sodium hydroxide solution.

EXAMPLE 15

A similar good level-dyeing assistant for rapid dyeing processes of polyester fiber material is obtained if instead of the addition product of Example 14 one condenses in the addition product of 7 moles of EO on to 1 mole of 4-hydroxybutyl stearate.

EXAMPLE 16

Wound packages of texturised polyester yarns are treated on an HT dyeing apparatus with a flow through them of a liquor at 130° C. with a liquid ratio of 1:10, which consists of soft water of a pH of 4.5 (adjusted with acetic acid) and 0.3 g/liter of a polycondensation product which was produced according to Example 1 by polycondensation from

| | |
|---|---|
| isophthalic acid | 50 moles percent |
| dimethyl terephthalate | 40 moles percent |
| dimethyl 5-sodiumsulphonato-propoxyisophthalate | 10 moles percent |
| diethyleneglycol | 100 moles percent and |
| polyglycol having a molecular weight of 600 | 10 moles percent | and to which there are mixed the same weight of an addition product of 30 moles of EO on to 1 mole of castor oil. The mixture was diluted with water as shown in Example 1.

There is added rapidly to this liquor by means of the injection unit a mixture of the following dispersion dyestuffs in commercial form predispersed with water at 40° C.:

0.46 percent by weight of a dyestuff of the formula

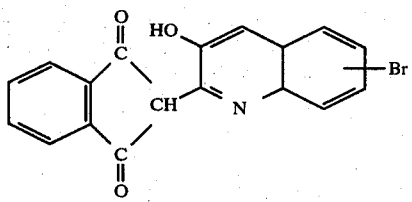

0.52 percent by weight of the dyestuff of the formula

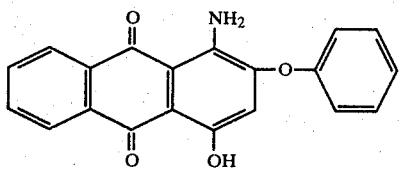

0.17 percent by weight of the dyestuff of the formula (of equal parts)

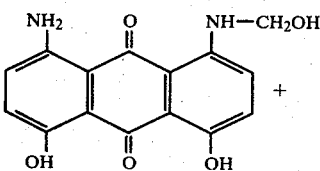

+

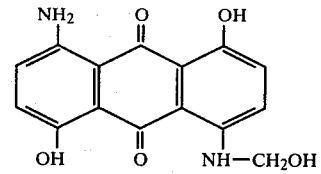

The throughflow quantity through the wound package is 20 liter per kg per minute. After treatment for 30 minutes at 130° C. the material is cooled, the dye bath let out and the dyed material cleaned by reduction.

There results a completely even brown dyeing of high fastness to rubbing with a full dyestuff yield.

If the same dyeing is carried out with the same dyestuffs under the same conditions except without condensing the addition product of 30 moles of EO on the castor oil into the added polyester, in order to obtain the same effect one requires 0.4 g per liter, that is to say 33% more, although this product contains double the quantity of the expensive polyester.

EXAMPLE 17

It can easily be shown be experiment that the EO addition product is chemically combined by the preformed polyester.

(a) if 4.5 g of the 20% strength solution of Example 1 is heated in an aluminium dish of a size of appr. 25 cm² for 2 hours at 120° in a drying oven, one obtains a colourless, soft and completely homogeneous film.

(b) If, however, one only stirs the EO addition product into the precondensed polyester and then dilutes it in the same way with water to a 20% adjustment, one obtains in the same way a strongly heterogeneous film: there are numerous colourless discs embedded in a soft milky turbid background.

Further indications of the chemical bonding are the considerably higher viscosity of the solution and also its higher molecular weight.

We claim:

1. A water soluble or dispersible polycondensate which is the reaction product of
   (a) one part by weight of a linear or branched polyester having an average molecular weight of 600 to 5000 and being soluble or dispersible in water, said polyester being obtained from the polycondensation of 100 moles percent of carboxylic acid having more than one —COOH moiety with 90 to 120 moles percent of diol or polyol compounds wherein 5 to 40 moles percent of the polyester precursors have sulfo substituents and
   (b) 0.2 to 2 parts by weight of a compound of the formula  R—O—(CH$_2$CH$_2$O)$_m$—CH$_2$CH$_2$OH wherein m is a number from 5 to 50 and R is selected from the group consisting of alkyl of 6–22 carbon atoms, alkenyl of 6–22 carbon atoms, alkanoyl of 6–22 carbon atoms, aryl of 6–22 carbon atoms, aralkyl of 6–22 carbon atoms, castor oil radical and

wherein R' is alkyl or alkenyl each having 6–22 carbon atoms, the reaction conducted at 100°–300°

C. wherein volalite reaction by-products are removed by distillation during the reaction.

2. A polycondensate according to claim 1 wherein (a) comprises polyester of the formula

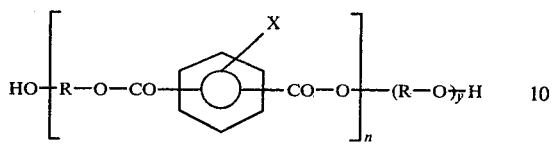

wherein n is a number sufficiently large that the average molecular weight of the polyester is 600 to 5000, y is zero or one, X is selected from the group consisting of hydrogen, $-O-CH_2-CH_2-CH_2-SO_3M$ and $-SO_3M$ wherein M is selected from the group consisting of hydrogen, alkali metal, ammonium, and substituted ammonium, and wherein R is selected from the group consisting of cyclic and acyclic alkyl of 2-10 carbon atoms, cyclic and acyclic alkenyl of 2-10 carbon atoms, and araliphatic of 2-10 carbon atoms, and araliphatic of 2-10 carbon atoms wherein the aliphatic moiety is alkyl of 2-4 carbon atoms or alkenyl of 2-4 carbon atoms.

3. A polycondensate according to claim 2 wherein the carboxylic acid reactant is a mixture of 10-20 mole percent dimethyl 5-sodium sulphonatoisphthalate or dimethyl 5-sodium sulphonatopropoxyisophthalate, 40-90 mole percent isophthalic acid or its simple esters, and 0-40 mole percent terephthalic acid or its simple esters.

4. A polycondensate according to claim 1 wherein the polyester comprises branched polyester derived from a mixture of carboxylic acids wherein 1-40 mole percent of the acids contain branching components.

5. A polycondensate according to claim 1 wherein the polyester is derived from hydroxy compounds comprising at least 40 mole percent selected from the group consisting of diethylene glycol, triethylene glycol and mixtures thereof.

6. Condensation process comprising the steps:
(a) heating one part by weight of a polyester having an average molecular weight of 600-5000 which is soluble or dispersible in water and obtained from the reaction of 100 moles percent of carboxylic acid having more than one-moiety with 90 to 100 moles percent of diol or polyol compounds wherein 5-40 moles percent of the polyester precursors have sulfo substituents,
(b) adding 0.2 to 2 parts by weight of a compound of the formula $R-O-(CH_2CH_2O)_m-CH_2CH_2OH$ wherein m is a number from 5-50 and R is selected from the group consisting of alkyl of 6-22 carbon atoms, alkenyl of 6-22 carbon atoms, alkanoyl of 6-22 carbon atoms, aryl of 6-22 carbon atoms, aralkyl of 6-22 carbon atoms, castor oil radical and

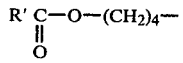

wherein R' is alkyl or alkenyl each having 6-22 carbon atoms,
(c) heating and reacting the mixture at 100°-300° C. for 10 minutes to 10 hours to thereby produce a polycondensate.

7. Condensation process according to claim 6 wherein volatile by-products of the reaction of step (c) are removed by distillation during the reaction.

8. Condensation process according to claim 6 wherein step (c) is accomplished in 2-5 hours.

9. Condensation process according to claim 6 wherein the reaction is conducted at 150°-250° C.

10. Condensation process according to claim 6 wherein the reaction is carried out in the presence of an esterification or transesterification catalyst.

11. Condensation process according to claim 6 wherein the reaction is carried out under a vacuum of 0.4-30 millimeters of mercury.

* * * * *